United States Patent [19]
Fukuda

[11] Patent Number: 5,533,235
[45] Date of Patent: Jul. 9, 1996

[54] HOSE CLAMP DEVICE

[75] Inventor: Yasuji Fukuda, Suwa, Japan

[73] Assignee: Kanesan Manufacturing Co., Ltd., Nagano-ken, Japan

[21] Appl. No.: 400,817

[22] Filed: Mar. 8, 1995

[30] Foreign Application Priority Data

Apr. 19, 1994 [JP] Japan ..................................... 6-005345

[51] Int. Cl.⁶ ................................................. B65D 63/00
[52] U.S. Cl. ................................... 24/20 R; 24/20 CW
[58] Field of Search ................................ 24/20 R, 20 CW, 24/20 EE, 20 W, 20 TT, 20 S, 23 EE

[56] References Cited

U.S. PATENT DOCUMENTS

| | | | |
|---|---|---|---|
| 4,299,012 | 11/1981 | Oetiker | 24/20 CW |
| 4,724,583 | 2/1988 | Ojima | 24/20 CW |
| 4,991,266 | 2/1991 | Oetiker | 24/20 CW |
| 5,105,509 | 4/1992 | Lilley | 24/20 R |
| 5,138,746 | 8/1992 | Ojima et al. | 24/20 CW |
| 5,251,360 | 10/1993 | Putz | 24/20 CW |

Primary Examiner—Victor N. Sakran
Attorney, Agent, or Firm—Beveridge, DeGrandi, Weilacher & Young

[57] ABSTRACT

A hose clamp device is made up of a metal strip member which is open at its both ends and formed in a ring shape with its both ends overlapping each other to define inner and outer end portions, the hose clamp device being fixed in place by a lock hole formed in the outer end portion and a lock peg formed on the inner end portion. An elongate notch extending in the lengthwise direction of the strip member is provided at the endmost section of the inner end portion of the strip member. A step is provided at a lengthwise intermediate position on the outer end portion of the strip member, the step receiving the endmost section of the inner end portion, corresponding in thickness to the strip member, and being provided on the inner surface thereof with an elongate notch extending along the lengthwise direction of the strip member. A clamper is provided on the outer end portion of the strip member, the clamper comprising a pair of upright pieces and a horizontal piece for connecting the upright pieces with each other. An elongate rib is provided on the horizontal piece of the clamper, the elongate rib extending in the lengthwise direction of the strip member.

2 Claims, 8 Drawing Sheets

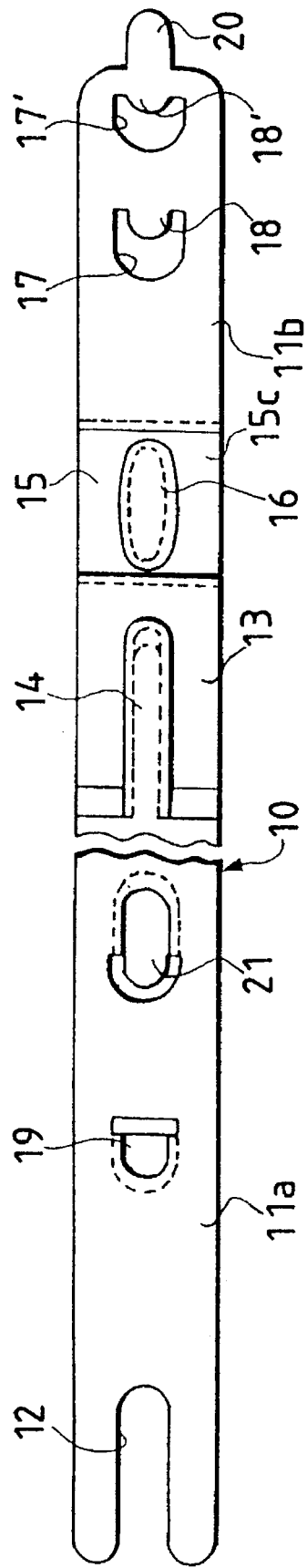
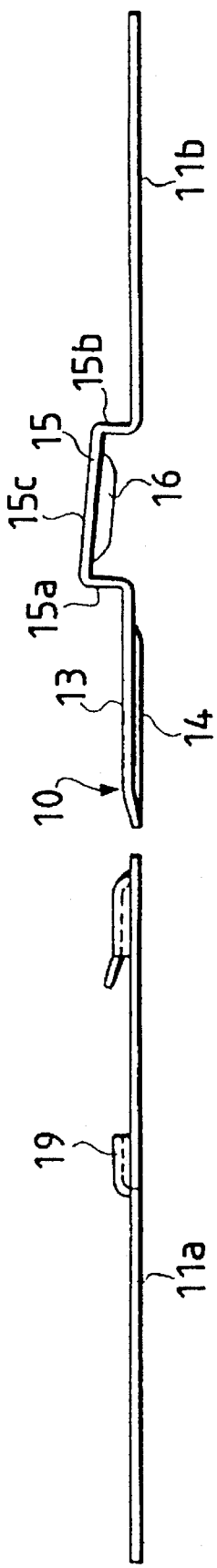
FIG. 15
FIG. 16

HOSE CLAMP DEVICE

BACKGROUND OF THE INVENTION

FIELD OF THE INVENTION

The present invention relates to a hose clamp device used when automotive parts are assembled together, typically when rubber hoses are connected to associated pipes.

PRIOR ART

One typical hose clamp used so far in the art will now be explained with reference to FIGS. 21 and 22.

The hose clamp shown is made of a metal strip member 1 which is open at both ends and formed into a ring shape. Both ends of this ring form of strip member 1 overlap each other to define inner and outer end portions. A lock pawl 2 extending outwardly from the inner end portion is engaged within a lock hole 3 formed in the outer end portion. Then, as shown in FIG. 22, a clamper 4 defined by a pair of upright pieces 4a and 4b and a horizontal piece 4c is compressed from both sides for hose clamping.

When the hose clamp is used for clamping, however, a gap L corresponding to the thickness of the strip member occurs at the endmost section of the inner end portion 1a, and entails a drop of sealability because the inner surface of the hose clamp becomes discontinuous in the circumferential direction.

To solve this problem, another hose clamp is proposed, as shown in FIG. 23. This hose clamp is basically identical with the first-mentioned hose clamp with the exception that the outer end portion of the strip member is provided with a step 5 corresponding to its thickness, into which the endmost section of the inner end portion 1a is inserted. In this hose clamp, too, a similar gap L' is likely to occur at the endmost section of the inner end portion 1a.

Each of these prior hose clamps has another problem in that when the clamper 4 is compressed from its both sides for clamping, any strong clamping force cannot be obtained because the horizontal member 4c is upwardly bent due to its feebleness.

In view of the foregoing problems, a primary object of the invention is to provide a hose clamp device which has a circumferentially continuous inner surface so that good sealability is achievable all over the inner surface and is designed such that when a clamper is compressed from its both sides, the horizontal piece thereof is unlikely to bend, and such that temporal locking and engagement can be done by one hand, resulting in an increased workability and reliable clamping.

DISCLOSURE OF THE INVENTION

According to the present invention, the object mentioned above is achieved by the provision of a hose clamp device made up of a metal strip member which is open at its both ends and formed in a ring shape with its both ends overlapping each other to define inner and outer end portions, said hose clamp device being fixed in place by use of a lock hole formed in said outer end portion and a lock peg formed on said inner end portion, characterized in that:

an elongate notch extending along the lengthwise direction of said strip member is provided at the endmost section of said inner end portion of said strip member, a step is provided at a lengthwise intermediate position on said outer end portion of said strip member, said step receiving the endmost section of said inner end portion, corresponding in thickness to said strip member, and being provided on the inner surface thereof with an elongate rib extending along the lengthwise direction of said strip member, a clamper is provided on said outer end portion of said strip member, said clamper comprising a pair of upright pieces and a horizontal piece for connecting said upright pieces with each other, and an elongate rib is provided on said horizontal piece of said clamper, said elongate rib extending along the lengthwise direction of said strip member.

Preferably, the lock hole formed in the outer end portion of the strip member is in a substantially semicircular form, extends along the lengthwise direction of said strip member and includes a small tongue extending along the lengthwise direction of said strip member and in the clamping direction.

Preferably, said lock peg projects outwardly and includes an opening which directs reversely to the clamping direction.

Preferably, a plurality of lock holes are provided in the outer end portion of the strip member, along the lengthwise direction of said strip member and at the required interval for the purpose of subassembling. It is then desired that the lock hole located in the vicinity of the endmost section of the strip member includes a small tongue that is somewhat shorter than that of another lock hole.

Preferably, the endmost section of said outer end portion of said strip member is provided with a tongue and said inner end portion of said strip member is provided with an outwardly projecting lock peg within which said tongue is engaged, and which is spaced away from the lock hole as desired.

BRIEF DESCRIPTION OF THE DRAWINGS

The present invention will now be described, by way of example only, with reference to the drawings, in which:

FIG. 15 is a partly cut-away plan view of the strip member used in the third embodiment of the invention, FIG. 16 is a partly cut-away side view of the strip member.

DETAILED DESCRIPTION OF THE PREFERRED EMBODIMENTS

Figure 1:
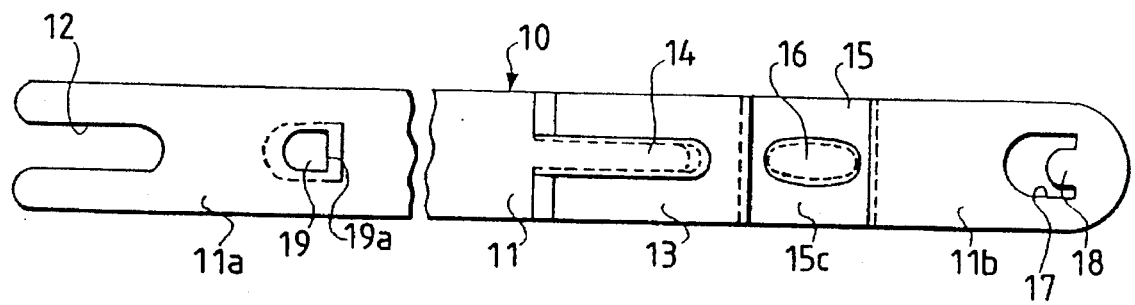
FIG. 1 is a partly cut-away plan view of the strip member used in the first embodiment of the present invention.
Figure 2:
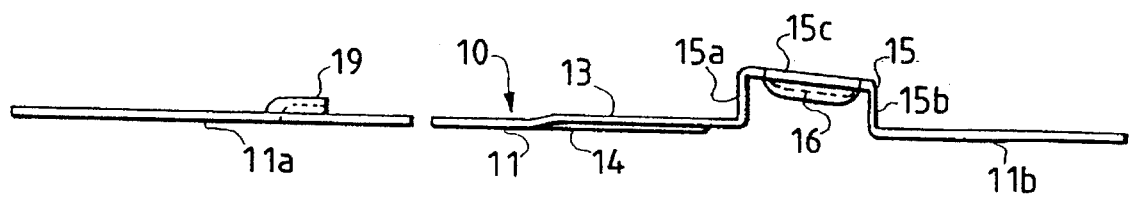
FIG. 2 is a partly cut-away side view of the strip member.
Figure 3:
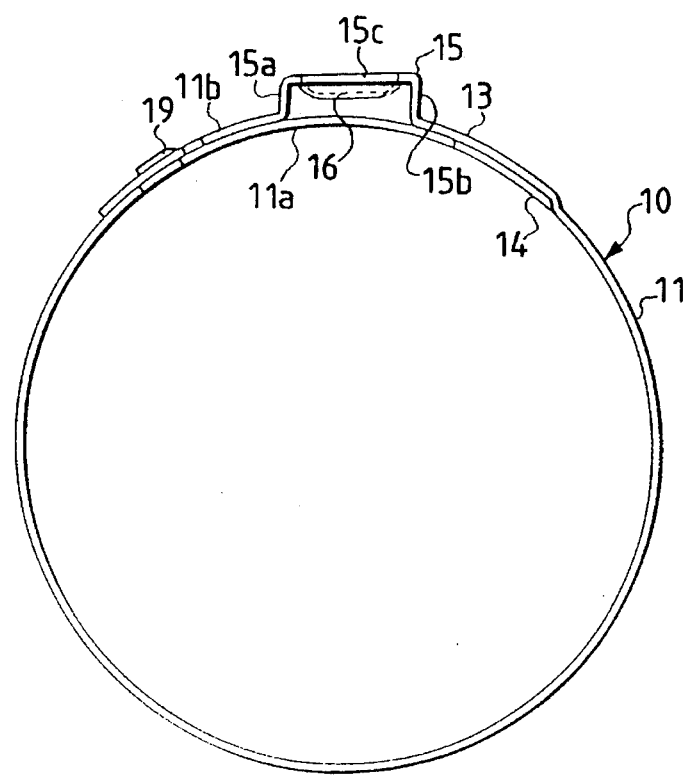
FIG. 3 is a front view of a ring form of strip member, when clamped.
Figure 4:
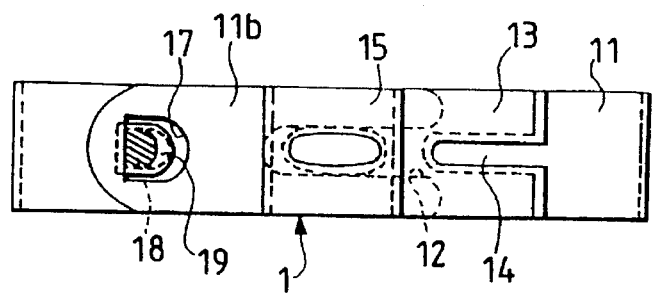
FIG. 4 is a plan view of a ring form of strip member, when clamped.
Figure 5:
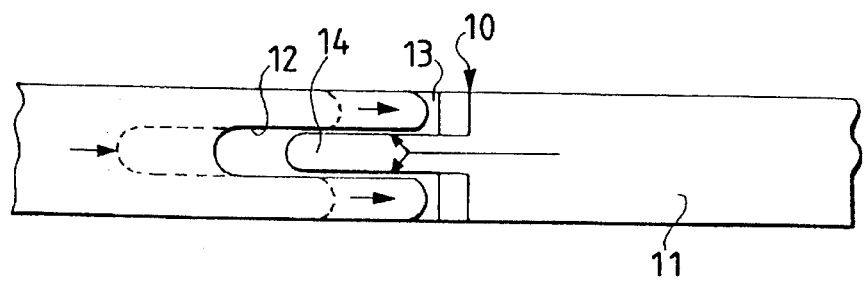
FIG. 5 is an enlarged view of the inner and outer end portions of the strip member, when overlapped.
Figure 6:
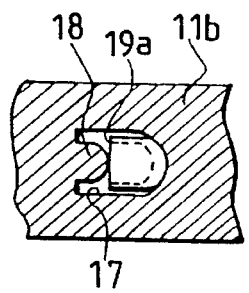
FIG. 6 is an enlarged plan view of the lock peg and hole combination.
Figure 7:
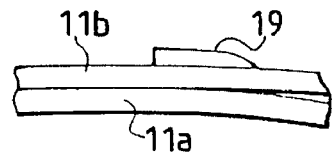
FIG. 7 is an enlarged side view of the lock peg and hole combination.
Figure 8:
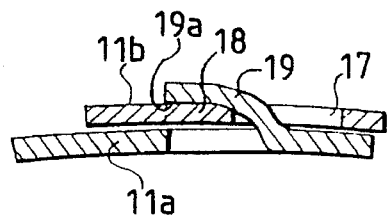
FIG. 8 is an enlarged, longitudinally sectioned view of the lock peg and hole combination.

Referring now to the first embodiment of the invention shown in FIGS. 1 through 9, a hose clamp device generally shown at 10 is made up of a metal strip member 11 typically formed of stainless steel, etc. The strip member 11 is formed in a ring shape for use, with its both ends overlapping each other to define inner and outer end portions. This hose clamp is fixed in place by engaging a small tongue of a lock hole (to be described later) with a lock peg. It is here noted that the endmost section of the outer end portion 11b of the strip member 11 is rounded, so making it possible to prevent something from being caught up there.

An elongate notch 12 is provided in the endmost section of the inner end portion 11a of the strip member 11, and extends along the lengthwise direction of the strip member 11. A step 13, which is as thick as the strip member 11, is provided at an intermediate position of the outer end portion 11b of the strip member 11. The step 13 is also provided with an elongate rib 14 extending along the lengthwise direction of the strip member 11.

A clamper shown generally at 15 is mounted on the outer end portion 11b, and is made up of a pair of upright pieces 15a and 15b and a horizontal piece 15c for connecting them with each other. The horizontal piece 15c is provided at its center with an elongate rib 16 extending along the lengthwise direction of the strip member 11.

A substantially semi-circular lock hole shown generally at 17 is provided in the outer end portion 11b of the strip member 11, and extends along the lengthwise direction of the strip member 11. The lock hole 17 includes a small tongue 18 that extends along the lengthwise direction of the strip member 11 and in the clamping direction.

An outwardly projecting lock peg shown generally at 19 is provided near the inner end portion 11a of the strip member 11, and includes an opening 19a formed in bulge directing reversely to the clamping direction. The small tongue 18 of the lock hole 17 formed in the outer end portion 11b is engaged with the lock peg 19 for clamping.

It is desired that the small tongue 18 be forced slightly down at its end, so that it can be smoothly engaged with the lock peg 19.

Figure 9:
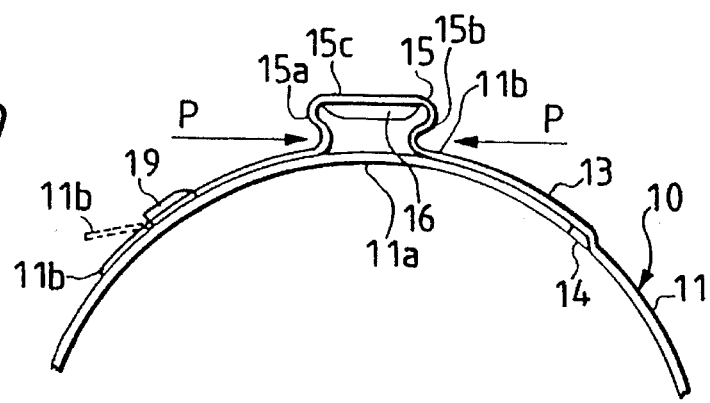
FIG. 9 is a partly cut-away front view of the clamper upon clamped.
Figure 10:
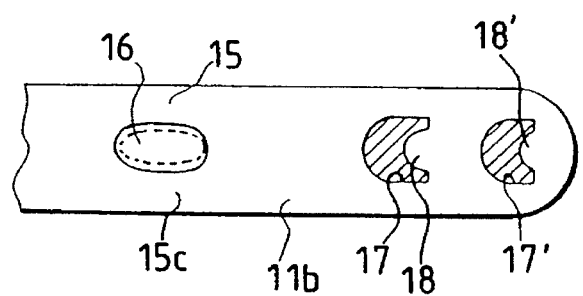
FIG. 10 is a partly cut-away plan view of the strip member used in the second embodiment of the invention.

As is the case with the prior art, the clamper 15 according to this embodiment of the invention is compressed from its both sides with forces shown by arrows P and P as shown in FIG. 9, using a clamping or other tool (not shown), so that clamping can be achieved as desired.

In this embodiment, the upright pieces 15a and 15b are different in length from each other, so that the horizontal piece 15c can be tilted as illustrated. Accordingly, when the clamper 15 is compressed from its both sides, it is unlikely that the horizontal piece 15c will incline from side to side. If the inner and outer end portions 11a and 11b of the strip member 11 and the elongate rib 14 formed on the inner surface of the step 13 on the outer end portion 11b are bent with the same curvature, it is then unlikely that the endmost section 11b' of the outer end portion 11 will swing up as shown by a phantom line upon the clamper compressed.

The second embodiment of the invention will now be explained with reference to FIGS. 10–14. It is here noted that this embodiment is identical with the first one with the exception that two lock holes are provided. Like parts are indicated by like reference numerals, and so will not be explained in detail.

In this embodiment, two lock holes 17 and 17' are provided near the outer end portion 11b of the strip member 11 along the lengthwise direction of the strip member 11 and at the required interval. The hole 17 includes a small tongue 18, while the hole 17' includes a small tongue 18' that is similar in shape to, but shorter than, the small tongue 18.

Figure 13:
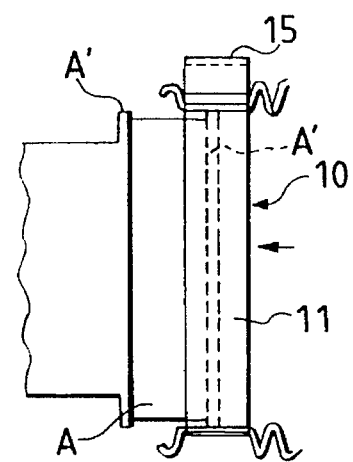
FIG. 13 is a side view of the hose clamp upon temporarily locked.
Figure 14:
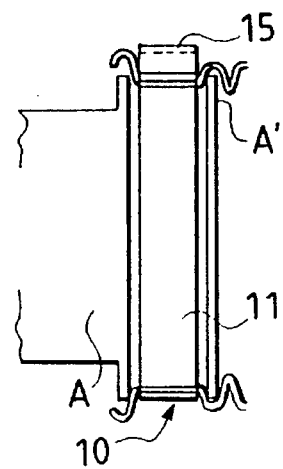
FIG. 14 is a side view of the hose clamp upon clamped.

According to this embodiment, the small tongue 18' of the lock hole 17' can be temporarily engaged with the lock peg 19, while it is slightly larger in diameter than a flange A' acting as a detent for a joint A, as shown in FIG. 13. To disengage the temporary engagement for clamping, if the small tongue 18 of the lock hole 17 is engaged with the lock peg 19, clamping can then occur with respect to the outer periphery of the joint A, as shown in FIG. 14.

Figure 11:
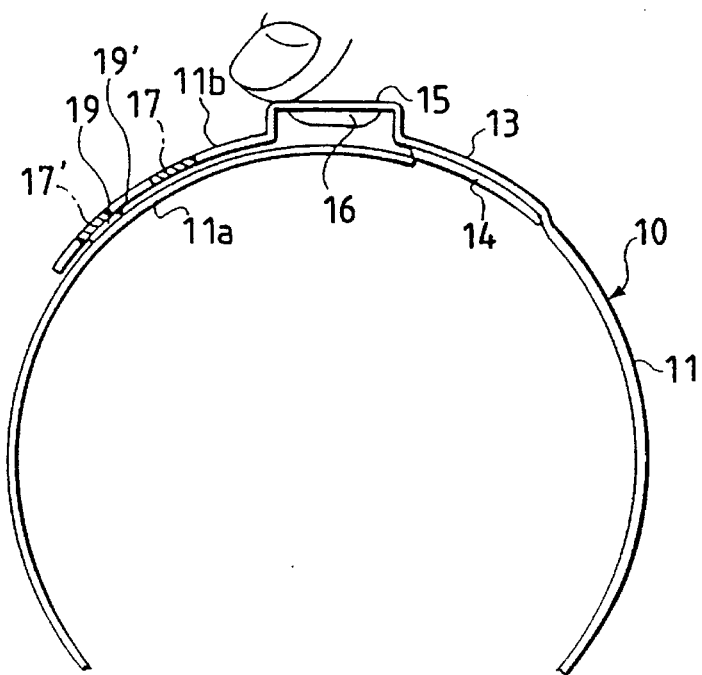
FIG. 11 is a view of how to use the hose clamp.
Figure 12:
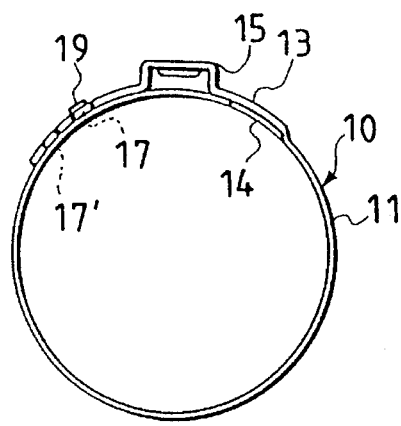
FIG. 12 is a front view of the strip member formed into a ring shape.

According to this embodiment, the small tongue 18' of the lock hole 17 can readily be engaged with the lock peg 19 by giving a light push to the clamper 15 by a finger, because a portion 19' of the lock peg 19 in opposition to its opening is rounded as shown in FIG. 11. Thus, the position where locking is to be done can be readily varied by one hand.

Figure 17:
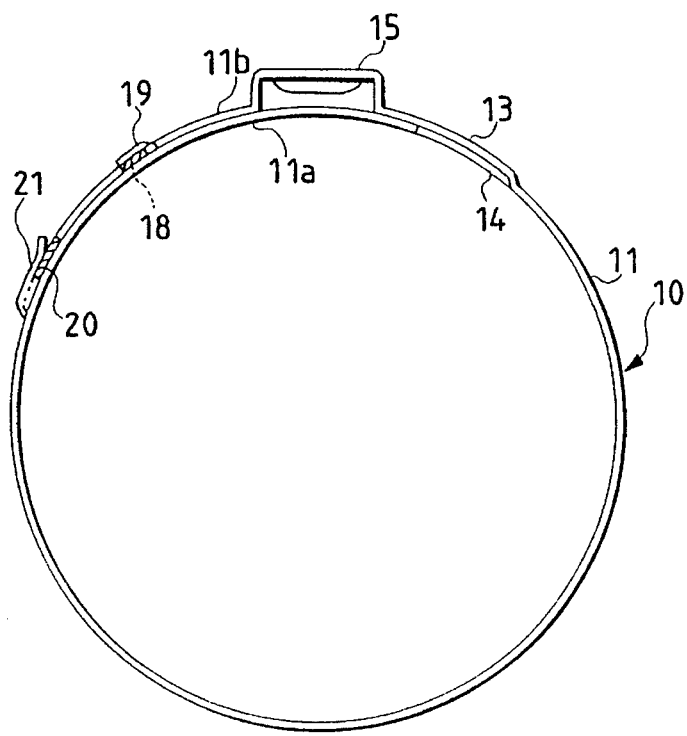
FIG. 17 is a front view of the strip member formed into a ring shape.

The third embodiment of the invention will now be explained with reference to FIGS. 15–17. It is noted that this embodiment is a modification of the arrangement of the second embodiment of the invention, wherein a tongue 20 is provided at the endmost section of the outer end portion 11b of the strip member 11 and the inner end portion 11a of the strip member 11 is provided with an outwardly projecting lock peg 21 with which the tongue 20 is to be engaged. An opening in the lock peg 21 directs reversely to the lock peg 19. This makes double locking possible, so that it is unlikely that some disengagement will occur or the tongue 20 will disengage from the lock peg 21. It is also possible to prevent any leaping-up of the outer end portion of the strip member.

Figure 18:
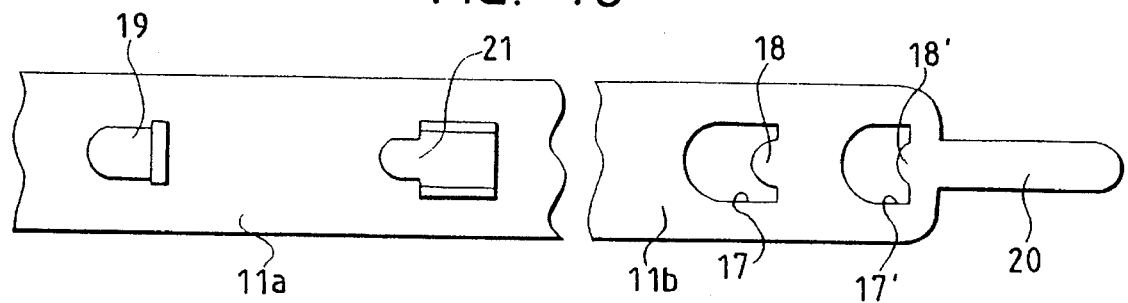
FIG. 18 is a partly cut-away plan view of the strip member used in one modification of the third embodiment of the invention.
Figure 19:
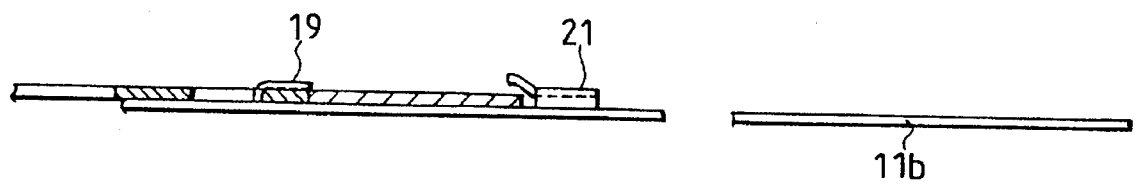
FIG. 19 is a partly cut-away side view of the strip member.
Figure 20:
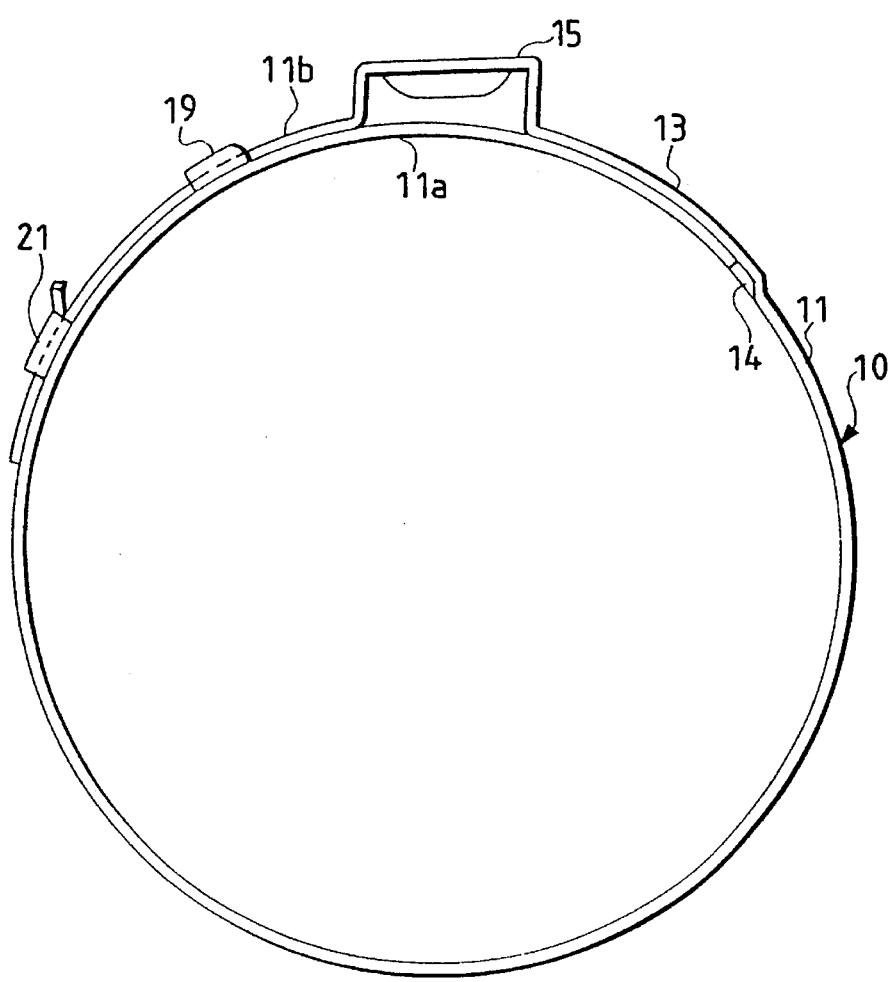
FIG. 20 is a front view of the strip member formed into a ring shape.
Figure 21:
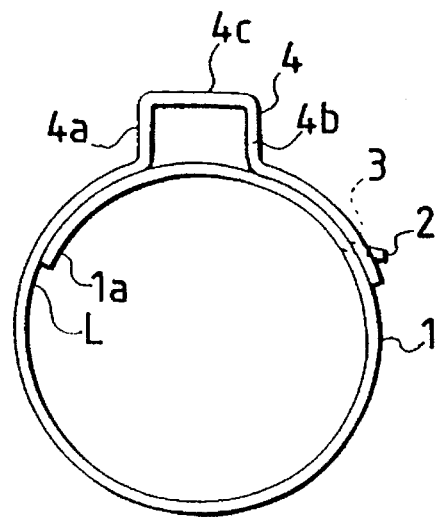
FIG. 21 is a front view of one conventional hose clamp.
Figure 22:
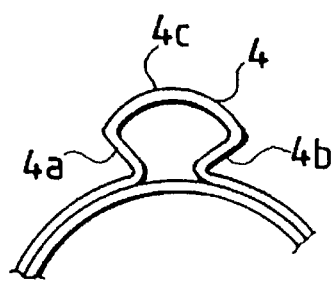
FIG. 22 is a view of the conventional hose clamp upon clamped.
Figure 23:
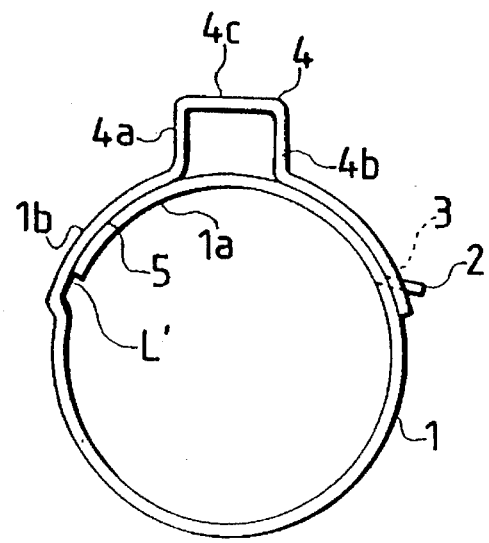
FIG. 23 is a front view of another conventional hose clamp.

Some modifications or changes may be made to the third embodiment of the invention as shown in FIGS. 18–20.

That is, the length of the tongue may be increased or, in the alternative, the lock peg 21 may be in a tunnel form.

According to the hose clamp of the invention, the inner surface of the hose clamp is circumferentially continuous with no dead space, because when clamped, the endmost section of the inner end portion of the strip member is engaged within the step corresponding in thickness to the strip member, which is located at a lengthwise intermediate position of the outer end portion of the strip member, and because the elongate rib extending along the lengthwise direction of the strip member is provided on the inner surface of the step of the outer end portion of the strip member.

When the endmost section of the inner end portion of the strip member is engaged within the step of the outer end portion of the strip member, the elongate rib on the inner surface of the step of the outer end portion is engaged within the elongate notch formed in that elongate notch extending along the lengthwise direction of the strip member.

These elongate notch and rib serve as a guide when the clamper is compressed, and is effective for preventing any possible widthwise variation of the outer and inner end portions of the strip member.

The hose clamp device of the invention has an increased strength, because the horizontal piece of the clamper provided on the outer end portion of the strip member is provided at the central position with the elongate rib extending along the lengthwise direction of the strip member. Consequently, when the clamper is compressed from its both sides, it is unlikely that the horizontal piece will bend up to be deformed, as is the case with the prior art.

The lock hole formed in the outer end portion of the strip member is readily engageable and disengageable from the lock peg formed on the inner end portion due to the structure that the small tongue of the lock hole is engaged with the lock peg through the opening of the latter.

The small tongue of the lock hole extends along the lengthwise direction of the strip member and is wrapped from above by the lock peg, so that reliable clamping is achievable. More reliable clamping may be obtainable, because it is unlikely that the lock peg will bend in the clamping direction even upon tightly clamped, unlike a conventional oblique lock pawl formed of material by cutting.

When a plurality of lock holes are provided, subassembly becomes possible, making it possible to engage temporarily for clamping in the state of slightly increased diameter. When the endmost section of the outer end portion of the strip member is provided with the tongue and the inner end portion is provided with the lock peg, double locking is achieved. This double locking, because of being not released even upon receiving external force, prevents disengagement or leaping-up.

I claim:

1. A hose clamp device made up of a metal strip member which is open at its both ends and formed in a ring shape with its both ends overlapping each other to define inner and outer end portions, said hose clamp device being fixed in place by use of a lock hole formed in said outer end portion and a first lock peg formed on said inner end portion, wherein:

an elongate notch extending along the lengthwise direction of said strip member is provided at the endmost section of said inner end portion of said strip member, a step is provided at a lengthwise intermediate position on said outer end portion of said strip member, said step receiving the endmost section of said inner end portion, corresponding in thickness to said strip member, and being provided on the inner surface thereof with an elongate rib extending along the lengthwise direction of said strip member, a clamper is provided on said outer end portion of said strip member, said clamper comprising a pair of upright pieces and a horizontal piece for connecting said upright pieces with each other, an elongate rib is provided on said horizontal piece of said clamper, said elongate rib extending along the lengthwise direction of said strip member, wherein said lock hole is in a substantially semicircular form, extends along the lengthwise direction of said strip member and includes a small tongue extending along the lengthwise direction of said strip member and in the clamping direction, said first lock peg projects outwardly and includes an opening which directs reversely to the clamping direction, wherein a plurality of lock holes are provided along the lengthwise direction of said strip member and at the required interval, wherein the endmost section of said outer end portion of said strip member is provided with a tongue and said inner end portion of said strip member is provided with a second lock peg outwardly projecting within which said tongue is engaged, and openings of said first and second lock pegs are directed in opposition to each other.

2. The hose clamp device according to claim 1, wherein said tongue is formed into a long length and said lock peg within which said tongue is engaged is formed into a tunnel shape.

* * * * *